United States Patent [19]
McCann et al.

[11] Patent Number: 6,052,725
[45] Date of Patent: Apr. 18, 2000

[54] NON-LOCAL DYNAMIC INTERNET PROTOCOL ADDRESSING SYSTEM AND METHOD

[75] Inventors: Peter J. McCann, Warrenville; Jin Wang, Lisle, both of Ill.

[73] Assignee: Lucent Technologies, Inc., Murray Hill, N.J.

[21] Appl. No.: 09/109,534

[22] Filed: Jul. 2, 1998

[51] Int. Cl.[7] .................................................. G06F 13/00
[52] U.S. Cl. ......................... 709/223; 709/217; 709/227; 709/245
[58] Field of Search .................................. 709/217, 218, 709/219, 220, 223, 224, 225, 226, 227, 228, 245; 370/389, 392, 466, 469

[56] References Cited

U.S. PATENT DOCUMENTS

| | | | |
|---|---|---|---|
| 5,835,723 | 11/1998 | Andrews et al. | 709/226 |
| 5,918,019 | 6/1999 | Valencia | 709/227 |
| 5,978,568 | 11/1999 | Abraham et al. | 709/224 |

*Primary Examiner*—Viet D. Vu

[57] ABSTRACT

A communication system having a local network communicating with a remote network for assigning a dynamic Internet Protocol address to a communication device to enable a communication session between the communication device and an IP network The communication device sends an address request to the local network. If the local network does not selectively assign a local dynamic IP address, the address request is transmitted to a remote network to determine whether a non-local dynamic IP address from a remote pool of non-local dynamic IP addresses is able to be assigned. The communication system selectively communicates with other remote networks until a non-local dynamic IP address can be assigned to satisfy the address request. Once a non-local dynamic IP address has been assigned, the non-local dynamic IP address will be maintained for the duration of the communication session between the communication device and the IP network. If the remote pool of non-local dynamic IP addresses is able to assign a non-local dynamic IP address, then a tunnel set up request is transmitted from the local router of the local network to the remote router of the remote network to establish and OSI layer 3 tunnel to enable communications between the communication device and the IP network.

37 Claims, 5 Drawing Sheets

NON-LOCAL DYNAMIC INTERNET PROTOCOL ADDRESSING SYSTEM AND METHOD

BACKGROUND OF THE INVENTION

This invention relates to telecommunications networks, and more particularly to telecommunications networks employing dynamic Internet Protocol (IP) addressing for packet-data services.

The recent increase in wireless data communications and modem dial-up for accessing information through the Internet has created demands for faster response times and more network availability. Internet Protocol (IP) provides standards for assigning addresses to different network nodes and is employed in routing messages through the data network. IP addresses are primarily assigned according to network topology typically associated with geographic locations of the communication devices which request access to the Internet.

There are two forms of IP address assignment, dynamic IP assignment and static IP assignment. In static IP addressing, the IP address assigned to a telecommunication service subscriber (such as an Internet service subscriber) is always fixed even if the subscriber is using his or her communication device outside of the assigned geographic area. Accordingly, static IP addressing only allows users to have an IP address that is associated with the assigned geographic location of the Internet access communication device. If the user requests data information from an area outside of the assigned geographic location, the requested communication must first be sent to the assigned geographic location and then forwarded to its final destination. Disadvantageously, static IP addressing has been known to create long response times and possibly reduced throughput.

Attempts have been made to solve some of these problems with dynamic IP addressing. Dynamic IP addressing assigns a new temporary IP address local to the requesting device according to its current location. Therefore, Internet access requests outside of the originally assigned network do not have to be routed back through the originally assigned network. Instead, communications may be processed directly at the geographic location of the new temporary local address. Unfortunately, in dynamic IP the local addresses which may be used are limited to only those which are available in the geographic coverage area where the requesting device is positioned. Thus, under certain circumstances there are still long response times and more often, perhaps, requests for access to Internet services are entirely refused. This is because dynamic IP addressing works only if an unassigned local address is available, the user must wait until one becomes available in the region or retry at a later time. As a result, at times users may be unable to access certain networks that are generally accessible when the requesting device is positioned at a non-remote location. Therefore, there is a need to create faster response times and limit Internet service refusals to subscribers by improving the dynamic IP addressing.

SUMMARY OF THE INVENTION

The above problems are solved by providing both local and non-local dynamic IP addressing to reduce the response times, increase service availability for Internet access requests, and allow access to more networks. The present invention extends the uses of dynamic IP addressing when the new dynamically assigned local IP address pool has been used up. Instead of waiting for a new local IP address to become available, this inventive method and system interact with a neighboring or remote network with a non-local dynamic IP address pool to assign a non-local dynamic IP address. If the non-local dynamic IP address pool is also used up, a search is made to interact with the next remote network. This continues until an IP address can be assigned to the requesting device and a tunnel is maintained between the local and remote networks for Internet access. Importantly, once the non-local dynamic IP address has been assigned, the non-local dynamic IP address may be used for the duration of the data session and need not be reassigned when the communication device moves to a new network. Service operators are enabled to use smaller pools because the network is able to use other pools if necessary. Advantageously, assignment of the first available IP address is made (whether local or non-local) instead of waiting for a local only IP address thereby reducing the potential response time and limiting or eliminating service request refusals.

BRIEF DESCRIPTION OF THE DRAWINGS

The advantages of the present invention will be explained in greater detail and others will be made apparent from the detailed description of the preferred embodiment which references several of the devices in the following drawings, in which.

DETAILED DESCRIPTION

Figure 1:
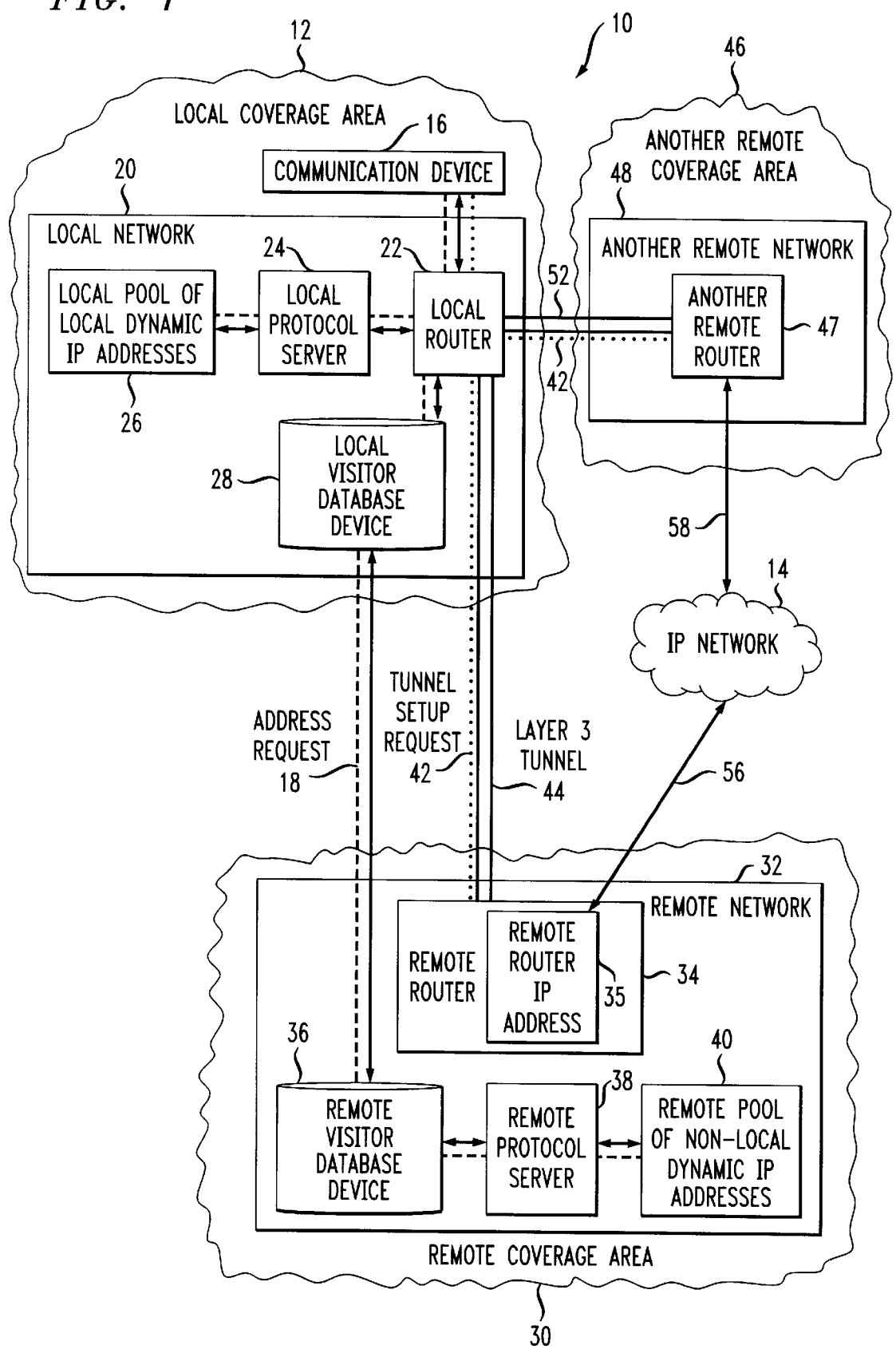
FIG. 1 is a block diagram of the communication system with a local network located in a local coverage area, a remote network located in a remote coverage area, and another remote network located in another remote coverage area.

Referring now to FIG. 1, communication system 10 is shown having a local network 20 for communicating with a remote network 32 and an Internet Protocol (IP) network 14. A communication device 16 is located in a local coverage area 12 that is associated with the local network 20. The communication device 16 may preferably be either a portable personal computer, a laptop computer or a smart cellular telephonic device capable of accessing data from the IP network 14. However, any communication device that is capable of communicating with or accessing voice, data, image, or video information from the IP network 14 may be selectively employed as the communication device 16. The IP network 14 is a network of computers interconnected by using the Internet Protocol. A common form of the IP network 14 is the Internet.

A dynamic Internet Protocol (IP) address is assigned to the communication device 16 to enable communication between the communication device 16 and the IP network 14. The dynamic IP address is assigned to the communication device 16 for the duration of a communication session between the communication device 16 and the IP network 14.

Dynamic IP addressing allows communication devices to flexibly respond to changes, such as changes in the geographic location of the communication device. Dynamic IP addressing assigns a dynamic IP address to a device only when it is needed for the duration of a data session. Dynamic IP addressing enables dynamic IP addresses to be re-used by different communication devices that connect to networks at different times. As such, a small pool of dynamic IP addresses can be shared to serve a large number of users. Dynamic IP addressing also allows for more direct routing of packets for lower-latency. Dynamic IP addressing enables the communication device 16 to be assigned a local dynamic IP address from the local pool of local dynamic IP addresses 26 of the local network 20 in the local coverage area 12 that the communication device 16 is located. In known systems, if the local network 20 is unable to assign a local dynamic IP address from the local pool of local dynamic IP addresses 26, the communication device 16 disadvantageously remains idle until a local dynamic IP address from the local pool of local dynamic IP addresses 26 becomes available.

The present invention overcomes such problems by enabling the communication device 16 to borrow a non-local dynamic IP address from a remote pool of non-local dynamic IP addresses 40 of a remote network 32 when the local network 20 is unable to assign a local dynamic IP address from the local pool of local dynamic IP addresses 26, or when the user of the communication device 16 prefers a non-local dynamic IP address from the remote pool of non-local dynamic IP addresses 40. Advantageously, this invention decreases the response times for communications between the communication device 16 and the IP network 14 because this arrangement avoids unnecessary network routing. Also, the ability to assign a non-local dynamic IP address from a remote pool of non-local dynamic IP addresses 40 enables the networks to use smaller pools of addresses. Smaller pools of addresses are beneficial because they may be less costly to the network administrators and are easier to obtain from IP address allocation authorities. Non-local dynamic IP addressing also enables more efficient mobility management. If the communication device 16 is mobile, then the communication device 16 may selectively be assigned a non-local dynamic IP address from a specific remote network that is optimized for mobility management.

As seen in FIG. 1, the communication device 16 by being physically located in a particular region is generally associated with the corresponding local coverage area 12 having an associated local network 20 with an associated local pool of local dynamic IP addresses 26. A remote coverage area 30 in the embodiment of FIG. 1 is associated with a particular region where the communication device 16 is not located. The remote coverage area 30 is generally associated with a remote network 32 with an associated remote pool of non-local dynamic IP addresses 40. The local network 20 has a local router 22 to enable communications between networks and the IP network 14. The local router 22 receives communications from the communication device 16 and from the IP network 14 and determines the paths that the communications should follow. The local visitor database 28 determines whether the communication device 16 prefers a non-local dynamic IP address for instance from a remote pool of non-local dynamic IP addresses 40.

Figure 5:
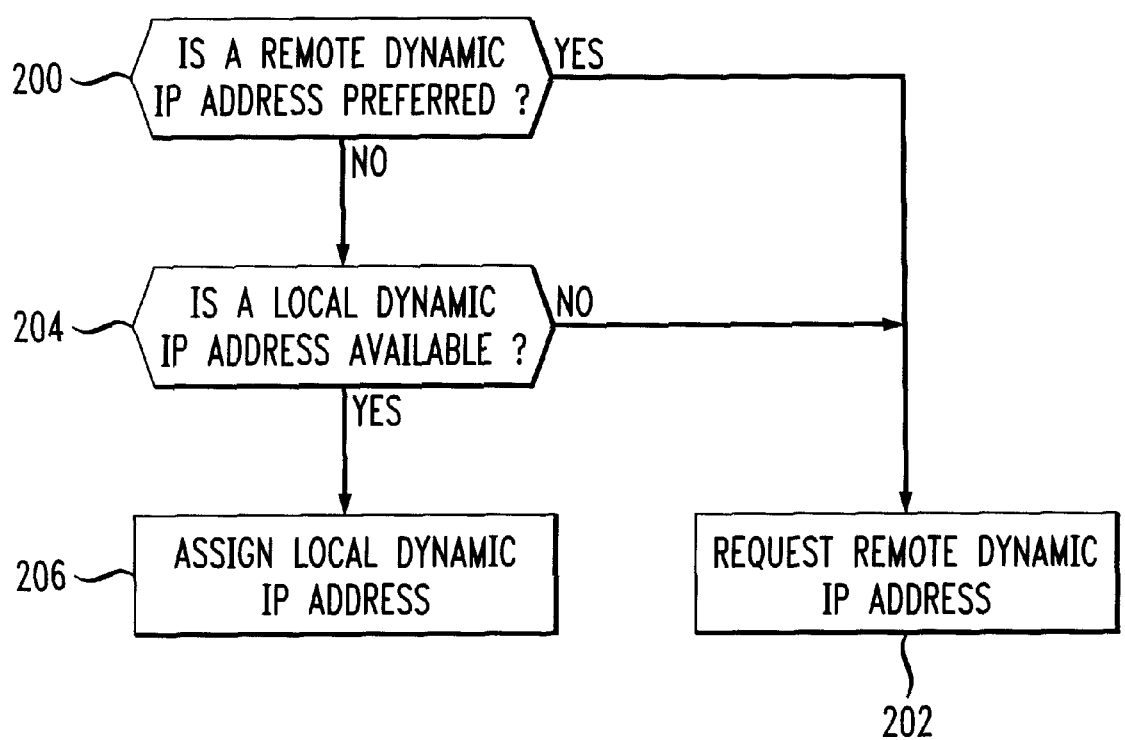
FIG. 5 is a flowchart showing the processing performed at the local router of the local network for determining non-local dynamic IP address assignment.

FIG. 5 is a flowchart of the processing steps of the decision process in the local network 20 to determine whether the communication device 16 requires a non-local dynamic IP address. The steps of FIG. 5 are preferably performed at the local visitor database 28 or other server of the local network 20. In step 200, FIG. 5, the local visitor database 28 or other server determines if the communication device 16 prefers a local dynamic IP address from the local pool of local dynamic IP addresses 26 or a non-local dynamic IP address from the remote pool of non-local dynamic IP addresses 40. If a non-local dynamic IP address is preferred, then in step 202, FIG. 5, the local visitor database 28 requests a non-local dynamic IP address from the remote network 32 associated with the remote pool of non-local dynamic IP addresses 40.

Referring again to step 200, FIG. 5, if the communication device does not prefer a non-local dynamic IP address then in step 204, FIG. 5, the local protocol server 24 determines whether a local dynamic IP address is able to be assigned to the communication device 16. If a local dynamic IP address is able to be assigned, then in step 206, FIG. 5, the local dynamic IP address is assigned to the communication device 16. However, if a local dynamic IP address is not able to be assigned, then the processing proceeds to step 202, FIG. 5, and the local network 20 requests a non-local remote dynamic IP address from the remote network 32 associated with the remote pool of non-local dynamic IP addresses 40.

Referring again to FIG. 1, the local network 20 also has a local visitor database device 28 to determine whether the communication device 16 is authorized to use the local network 20 when the communication device 16 requests network services. The local visitor database device 28 is preferably either: (a) a remote authentication dial in user service (RADIUS) server or (b) an american national standards institute (ANSI)-41 server. The RADIUS server receives queries regarding which services the communication device 16 is authorized to use. The RADIUS server then responds to those queries by answering which services the communication device 16 is authorized to use and provides configurations for those services. The ANSI-41 server is specialized for the field of mobile telecommunications. The ANSI-41 server receives queries regarding which services the communication device 16 is authorized to use and the user's service profile. The ANSI-41 server then responds to those queries by answering which services the communication device 16 is authorized to use and the user's service profile and provides configurations for those services.

The local network 20 also has a local pool of local dynamic IP addresses 26 which is a collection of local dynamic IP addresses for the local network 20. A local protocol server 24 is further provided to manage the local pool of local dynamic IP addresses 26. The local protocol server 24 is preferably a Dynamic Host Configuration Protocol (DHCP) server. The DHCP server 24 enables a network to dynamically assign IP addresses to communication devices automatically. Once the communication session has ended, the local DHCP server reclaims the local dynamic IP address from the communication device 16 and makes the address available for reuse in the local pool of local dynamic IP addresses 26.

To enable communication between the communication device 16 and the IP network 14, the communication device 16 transmits the address request 18 to the local network 20. The provided information enables the local network 20 to route the address request 18 to receive a dynamic IP address. The assignment of a dynamic IP address enables the communication device 16 to communicate with the IP network 14.

As seen in FIG. 1, the address request 18 is transmitted from the communication device 16 to the local router 22 and then to the local visitor database device 28. The local visitor database device 28 then determines whether a non-local dynamic IP address is preferred. If a non-local dynamic IP address is not preferred, the local router 22 transmits the address request 18 to the local protocol server 24. The local protocol server 24 determines whether a local dynamic IP address from the local pool of local dynamic IP addresses 26 is available to be assigned to the address request 18.

In response to the determination that a local dynamic IP addresses from the local pool of local dynamic IP addresses 26 is able to be assigned, the local dynamic IP address from the local pool of local dynamic IP addresses 26 is assigned to satisfy the address request 18. The local dynamic IP address from the local pool of local dynamic IP addresses 26 is transmitted from the local protocol server 24 to the local router 22. The local dynamic IP address from the local pool of local dynamic IP addresses 26 is transmitted from the local router 22 to the communication device 16 to enable communication with IP network 14.

In response to the determination that a non-local dynamic IP address is preferred or that a local dynamic IP address from the local pool of local dynamic IP addresses 26 is unable to be assigned, the local network 20 of the local coverage area 12 selectively communicates with a remote network 32. As seen in the embodiment of FIG. 1, the communication device 16 is associated with the local coverage area 12. FIG. 1 also shows that the communication device 16 is located in the local coverage area 12 which is communicating with a remote network 32 that is located in the remote coverage area 30. FIG. 1 illustrates the communication system 10 when the local network 20 selectively communicates with a remote network 32.

As seen in FIG. 1, the remote network 32 has a remote router 34 that receives communications from other networks and determines the paths that the communications should follow. A remote visitor database device 36 is also provided to determine whether communication device 16 is authorized to use the remote network 32 to receive a non-local dynamic IP address from a remote pool of non-local dynamic IP addresses 40. The remote visitor database device 36 is preferably either a RADIUS server or an ANSI-41 server. The RADIUS server receives queries regarding which services the communication device 16 is authorized to use. The RADIUS server then responds to those queries by answering which services the communication device 16 is authorized to use and provides configurations for those services. The ANSI-41 server is specialized for the field of mobile telecommunications. The ANSI-41 server receives queries regarding which services the mobile communication device 16 is authorized to use and the user's service profile. The ANSI-41 server then responds to those queries by answering which services the communication device 16 is authorized to use and the user's service profile and provides configurations for those services.

The remote network 32 also has a remote pool of non-local dynamic IP addresses 40 that is a collection of non-local dynamic IP addresses for the remote network 32. A remote protocol server 38 is further provided to manage the remote pool of non-local dynamic IP addresses 40. The remote protocol server 38, preferably a remote DHCP server enables a network to dynamically assign non-local dynamic IP addresses to various communication devices automatically. Once the communication session has ended, the remote DHCP server reclaims the non-local dynamic IP address of the remote pool of non-local dynamic IP addresses 40 from the communication device 16.

To receive a non-local dynamic IP address from the remote pool of non-local dynamic IP addresses 40, preferably the local router 22 of the local network 20 transmits the address request 18 to the local visitor database device 28 of the local network 20. The local visitor database device 28 transmits the address request 18 to the remote visitor database device 36 of the remote network 32. The remote visitor database device 36 transmits the address request 18 to the remote protocol server 38 of the remote network 32. The remote protocol server 38 determines whether a non-local dynamic IP address from the remote pool of non-local dynamic IP addresses 40 is able to be assigned.

Figure 2:
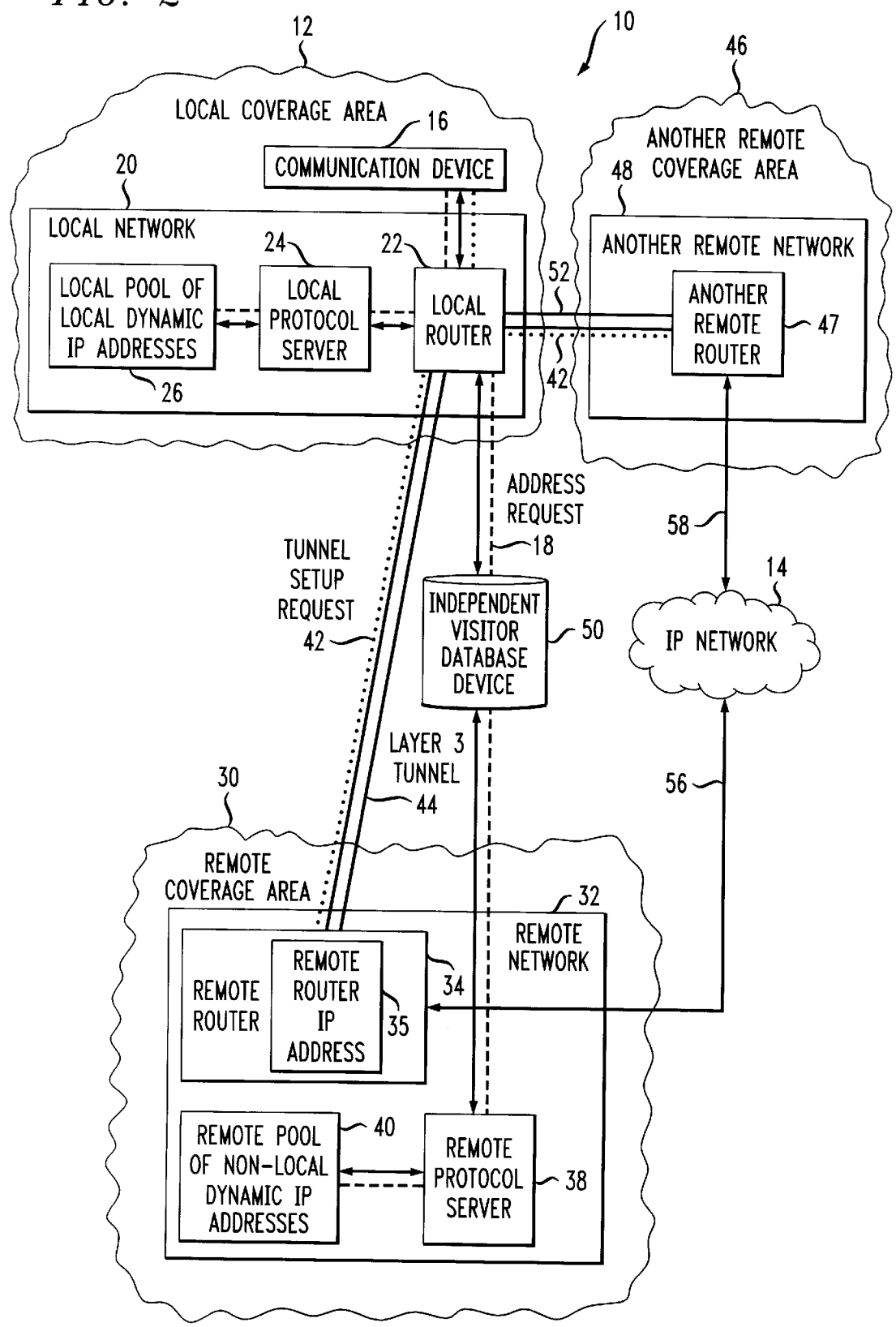
FIG. 2 is a block diagram of an alternative configuration of the communication system of FIG. 1 having an independent visitor data base device.

Referring now to FIG. 2, an alternative embodiment of the communication system 10 providing an alternative configuration for transmitting the address request 18 to the remote network 32 is shown. The address request 18 is selectively transmitted from the local router 22 to an independent visitor database device 50 that is outside of both the local coverage area 12 and the remote coverage area 30. The independent visitor database device 50 which is not solely associated to any single network is used and shared by the local network 20, the remote network 32, and possibly other remote networks. The independent visitor database 50 performs the steps seen in FIG. 5. The independent visitor database device 50 is preferably either a RADIUS server or an ANSI-41 server. The independent visitor database device 50 then transmits the address request 18 to the remote protocol server 38 of the remote network 32 in the remote coverage area 30.

Figure 3:
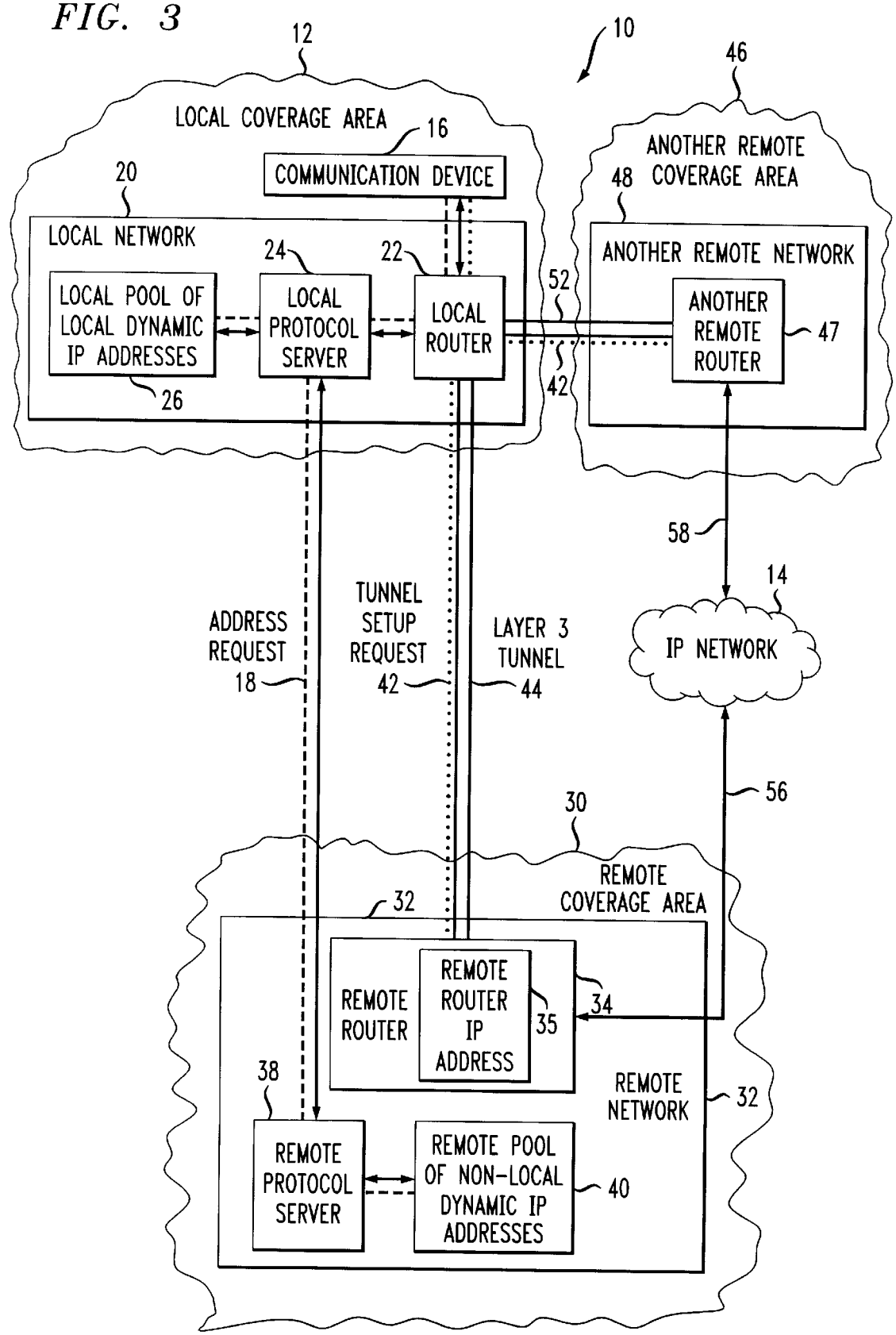
FIG. 3 is a block diagram of another alternative configuration of the communication system in FIG. 1 with a local coverage area associated with a local network, a remote coverage area associated with a remote network, and another remote coverage area associated with another remote network.

Referring now to FIG. 3, another alternative embodiment of the communication system 10 providing an alternative configuration for transmitting the address request 18 to the remote network 32 is shown. The address request 18 may alternatively be transmitted from the local network 20 to the remote network 32 by transmitting the address request from the local router 22 of the local network 20 to the local protocol server 24 of the local network 20. The local protocol server 24 then transmits the address request to the remote protocol server 38 of the remote network 32. The communication processing accordingly follows the same format as described in FIG. 1.

Figure 4:
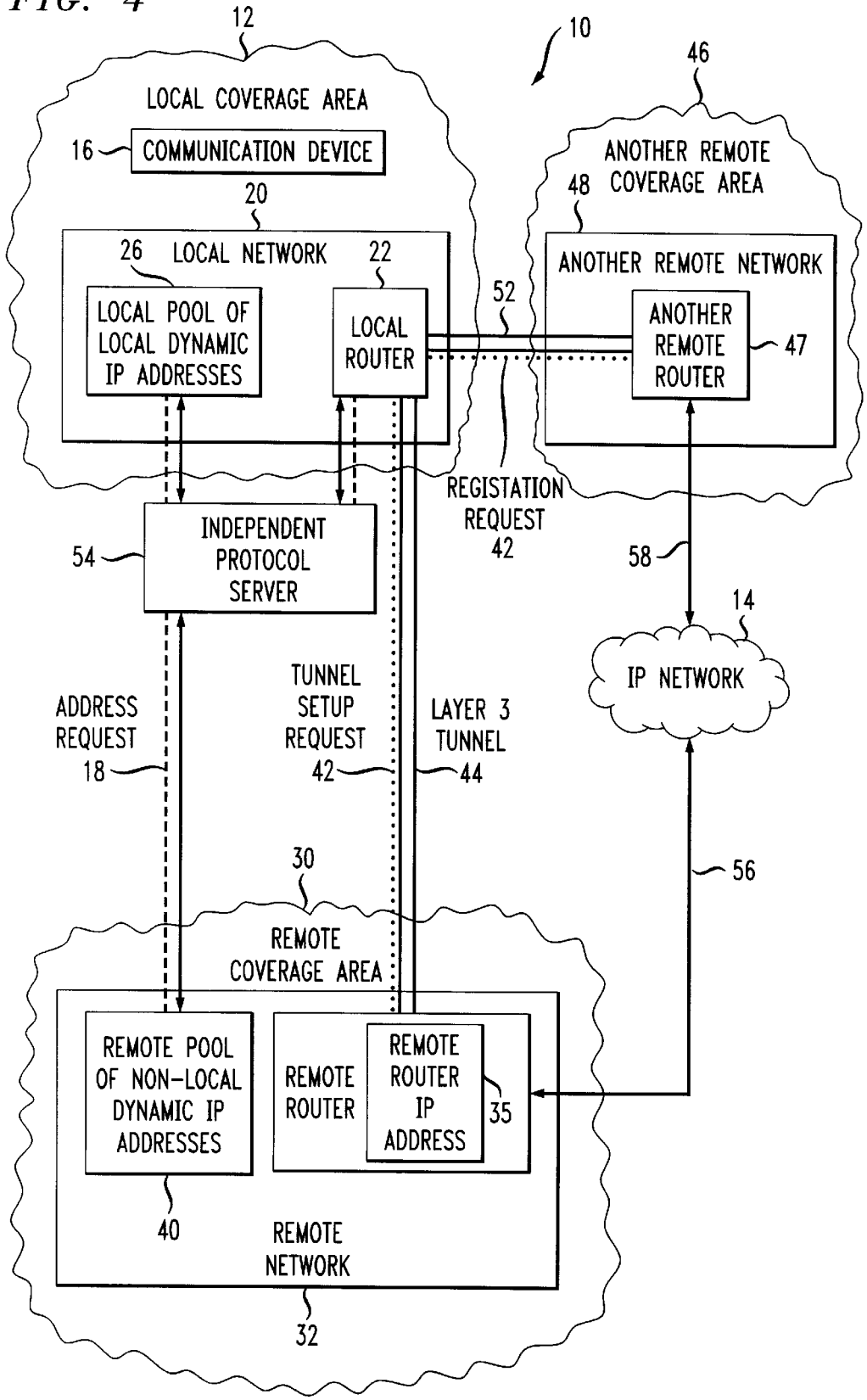
FIG. 4 is a block diagram of yet another alternative communication system employing an independent protocol server.

Referring now to FIG. 4, yet another alternative embodiment providing an alternative configuration for transmitting the address request 18 to the remote network 32 is shown. The address request 18 is selectively transmitted from the local router 22 to an independent protocol server 54 that is outside of both the local coverage area 12 and the remote coverage area 30. The independent protocol server 54 is provided to manage the local pool of local dynamic IP addresses 26, the remote pool of non-local dynamic IP addresses 40 and possibly other pools. The independent protocol server 54, preferably an independent DHCP server, enables a network to dynamically assign IP addresses to the communication device 16 automatically. The independent protocol server 54 enables the communication device 16 to use a local dynamic IP address from the local pool of local dynamic IP addresses 26 or a non-local dynamic IP address from the remote pool of non-local dynamic IP address 40 for the duration of the communication session with the IP network 14. Once the communication session has ended, the independent DHCP server 54 reclaims the dynamic IP address from the communication device 16. Further communication processing in the system is the same as described with reference to FIG. 1.

Referring again to FIG. 1, in response to the determination that a non-local dynamic IP address from the remote pool of non-local dynamic IP addresses 40 is able to be assigned, the non-local dynamic IP address is transmitted from the remote protocol server 38 to the remote visitor database device 36. The non-local dynamic IP address from the remote pool of non-local dynamic IP addresses 40 and a remote router's IP address 35 of the remote router 34 are transmitted from the remote visitor database device 36 to the local visitor database device 28 of the local network 20. The non-local dynamic IP address from the remote pool of non-local dynamic IP addresses 40 and the remote router's IP address 35 are then transmitted from the local visitor database device 28 to the local router 22.

Before the non-local dynamic IP address can be transmitted from the local router 22 to the communication device 16, the local router 22 sends a tunnel set up request 42 to the remote router 34 using the remote router's IP address 35. An open systems interconnection (OSI) layer 3 (that is the network layer) tunnel 44 is established between the local router 22 of the local network 20 and the remote router 34 of the remote network 32. The OSI layer 3 tunnel 44 is preferably a Mobile IP tunnel. The OSI layer 3 tunnel 44 is used to transmit IP packets from the communication device 16 to the IP network 14 and from the IP network 14 to the communication device 16 through the OSI layer 3 tunnel 44 and the communication link 56. The remote router 34 establishes a communication 56 with the IP network 14. Once the OSI layer 3 tunnel 44 is established, the non-local dynamic IP address and the remote router's IP address 35 are transmitted to the communication device 16.

To enable transmission of the non-local dynamic IP address from the local router 22 to the communication device 16, modifications to the local router 22 are selectively made to allow a non-local dynamic IP address and the remote router's IP address 35 to be carried with a configure Nak message from the local router 22 to the communication device 16. In establishing Internet access, the communication device 16 preferably transmits a configure Request message to the local router 22. The local router 22 in turn responds with a configure Nak message. Preferably, configure Nak messages are sent from the local router 22 to the communication device 16 by enabling extensions to preferably the Internet Protocol Control Protocol (IPCP) which is a phase of Point-to-Point Protocol (PPP). The PPP allows the communication device 16 to connect to the local network 20. To enable assignment of non-local dynamic IP addressing, the IPCP may be selectively enhanced to permit a non-local dynamic IP address as well as the remote router's IP address 35 to be carried with a configure Nak message.

In response to the determination that a non-local dynamic IP address from the remote pool of non-local dynamic IP addresses 40 is unable to be assigned, the local network 20 selectively communicates to another remote network 48 to determine whether a non-local dynamic IP address from a remote pool of non-local dynamic IP addresses associated with the other remote network 48 is able to be assigned. The local network 20 selectively communicates with other remote networks as deemed necessary until a non-local dynamic IP address can be assigned to the address request 18. Before the non-local dynamic IP address can be assigned to the communication device 16, an OSI layer 3 tunnel 52 is established between the local router 22 of the local network 20 and the other remote router 47 of the other remote network 48. The other OSI layer 3 tunnel 52 is used to transmit IP packets from the communication device 16 to the IP network 14 and from the IP network 14 to the communication device 16 through the tunnel 52 and communication link 58. The other remote router 47 establishes the other communication link 58 with the IP network 14.

Once the non-local dynamic IP address from the remote pool of non-local dynamic IP addresses 40 has been assigned from the remote network 32 to the communication device 16, the non-local dynamic IP address is used for the duration of the communication session between the communication device 16 and the IP network 14.

During the communication session between the communication device 16 and the IP network 14, if the communication device 16 is moved from the local coverage area 12 into the remote coverage area 30 that is associated with the remote network 32 having the remote pool of non-local dynamic IP addresses 40 that assigned the non-local dynamic IP address, the non-local dynamic IP address from the remote pool of non-local dynamic IP addresses 40 will be maintained. In some instances, the communication device 16 may be moved into the remote coverage area 30. For example, if the communication device 16 is a portable wireless laptop computer or a programmed cellular telephone accessing data from the Internet while in transit such as riding in an automobile or on a train the device may move from one coverage area to another coverage area during the trip. The layer 3 tunnel 44 between the local router 22 of the local coverage area 12 and the remote router 34 of the remote coverage area 30 is removed when the communication device 16 moves into the remote coverage area 30 associated with the remote pool of non-local dynamic IP addresses 40 that assigned the non-local dynamic IP address to the communication device 16. In response to the removal, the remote network 32 of the remote coverage area 30 functions as a local network because the remote network 32 is able to provide direct access from the communication device 16 to the IP network 14 as if the remote network 32 had assigned the non-local dynamic IP address as a local dynamic IP address from a local pool of local dynamic IP addresses.

On the other hand, if the communication device 16 moves to another remote coverage area 46 a new OSI layer 3 tunnel between remote router 47 and the remote router 34 is established by the other remote network 48 using the remote router's IP address 35. The previous OSI layer 3 tunnel 44 between the remote router 34 and the local router 22 is removed. The communication path to the IP network 14 is the communication link 56.

When the communication session between the communication device 16 and the IP network 14 ends, the non-local dynamic IP address that was assigned to the communication device 16 is returned to the remote pool of non-local dynamic IP addresses 40 that originally assigned the non-local dynamic IP address. Also, the OSI layer 3 tunnel 44 is removed.

While a detailed description of the preferred embodiments of the invention have been given, it should be appreciated that many variations can be made thereto without departing from the scope of the invention as set forth in the appended claims.

What is claimed is:

1. A method of providing dynamic Internet Protocol (IP) addressing in a communication system having a communication device for accessing data from an IP network such that the communication device is associated with a local network having a local pool of local dynamic IP addresses, comprising the steps of:

transmitting an address request from the communication device to the local network;

selecting a remote network to receive the address request in which the remote network has a remote pool of non-local dynamic IP addresses;

determining if the remote pool of non-local dynamic IP addresses of the remote network is able to assign a non-local dynamic IP address;

assigning the communication device the non-local dynamic IP address from the remote pool of non-local dynamic IP addresses of the remote network in response to the determination that the remote pool of non-local dynamic IP addresses is able to assign the non-local dynamic IP address; and establishing an OSI layer 3 tunnel between the local network and the remote network for transmission of IP packets.

2. The method of claim 1 including the steps of determining that the communication device is located in a local coverage area, determining that the local coverage area is associated with the local network having the local pool of local dynamic IP addresses.

3. The method of claim 2 including the steps of determining that the non-local dynamic IP address was assigned from the remote network associated with a remote coverage area, determining that the communication device has moved into the remote coverage area, removing the OSI layer 3 tunnel between the local network and the remote network, and treating the local network as the remote network such that the remote network functions as another local network.

4. The method of claim 3 including the steps of determining that the communication device has moved from the remote coverage area to another coverage area associated with another remote network, establishing a new OSI layer 3 tunnel between another remote router of the other remote network and the remote router, and removing the OSI layer 3 tunnel between the local network and the remote network.

5. The method of claim 3 including the steps of determining that the non-local dynamic IP address was assigned from another remote network associated with another remote coverage area, determining that the communication device has moved into the other remote coverage area, and treating the local network as the other remote network such that the other remote network functions as another local network.

6. The method of claim 1 including the step of transmitting a configure Nak message carrying the non-local dynamic IP address from a local router of the local network to the communication device.

7. The method of claim 1 including the steps of determining if the communication device is able to receive a local dynamic IP address, and determining if the local pool of local dynamic IP addresses of the local network is able to assign a local dynamic IP address in response to the determination that the communication device is able to receive a local dynamic IP address.

8. The method of claim 1 including the steps of establishing a communication link between the local network and the remote network, transmitting the address request from the communication device to a local router of the local network, transmitting the address request from the local router of the local network to a local visitor database device of the local network, and transmitting the address request from the local visitor database device to a remote visitor database device of the remote network.

9. The method of claim 1 including the steps of establishing the communication link between the local network and the remote network, transmitting the address request from a local router of the local network to an independent visitor database, and transmitting the address request from the independent visitor database to a remote protocol server of the remote network.

10. The method of claim 9 in which the independent visitor database is either:
(a) a RADIUS server, or
(b) an ANSI-41 server.

11. The method of claim 8 in which establishing the communication link between the local network and the remote network includes the steps of transmitting the address request from the local router of the local network to a local protocol server of the local network, and transmitting the address request from the local protocol server of the local network to a remote protocol server of the remote network.

12. The method of claim 8 in which establishing the communication link between the local network and the remote network includes the steps of transmitting the address request from the local router of the local network to an independent protocol server, and transmitting the address request from the independent protocol server to either a local pool of local dynamic IP addresses or a remote pool of non-local dynamic IP addresses.

13. The method of claim 8 in which the local visitor database device of the local network and the remote visitor database device of the remote network are both either:
(a) RADIUS servers, or
(b) ANSI-41 servers.

14. The method of claim 8 including the steps of transmitting the address request from the remote visitor database device of the remote network to a remote protocol server of the remote network, and transmitting the address request from the remote protocol server of the remote network to the remote pool of non-local dynamic IP addresses of the remote network.

15. The method of claim 14 including the steps of assigning the address request the non-local dynamic IP address usable for the duration of a communication session between the communication device and the IP network, transmitting the non-local dynamic IP address from the remote pool of non-local dynamic IP addresses of the remote network to the remote protocol server of the remote network, transmitting the non-local dynamic IP address from the remote protocol server of the remote network and a remote router's IP address to the remote visitor database device of the remote network, transmitting the non-local dynamic IP address and the remote router's IP address from the remote visitor database device of the remote network to the local visitor location device of the local network, transmitting the non-local dynamic IP address and the remote router's IP address from the local visitor location device of the local network to the local router of the local network, transmitting the non-local dynamic IP address and the remote router's IP address from the local router of the local network to the communication device, and maintaining the non-local dynamic IP address upon the communication device moving to another remote coverage area associated with another remote network.

16. The method of claim 14 including the steps of determining that the remote pool of non-local dynamic IP addresses of the remote network is not able to assign a non-local dynamic IP address, and assigning a non-local dynamic IP address from another remote network that is able to assign the non-local dynamic IP address in response to the determination that the remote pool of non-local dynamic IP addresses is not able to assign a non-local dynamic IP address.

17. The method of claim 1 including the steps of transmitting a tunnel set up request from the local router of the local network to a remote router of the remote network to establish the OSI layer 3 tunnel, establishing a communication link between the remote router of the remote network and the IP network, and transmitting the data communication between the communication device and the IP network via the tunnel from the local router of the local network and the remote router of the remote network.

18. The method of claim 1 including the steps of determining that a communication session between the communication device and the IP network has been terminated, returning the non-local dynamic IP address to the remote pool of non-local dynamic IP addresses, and removing the OSI layer 3 tunnel between a local router of the local network and a remote router of the remote network.

19. A communication system for assigning Internet Protocol (IP) addressing having a communication device for accessing data from an IP network such that the communication device is associated with a local network having a local pool of local dynamic IP addresses, comprising:

means for sending an address request from the communication device to the local network;

means for selecting a remote network having a remote pool of non-local dynamic IP addresses to receive the address request;

means for sending the address request from the local network to the remote network;

means for determining if the remote pool of non-local dynamic IP addresses of the remote network is able to assign a non-local dynamic IP address;

means for assigning the mobile communication device the non-local dynamic IP address from the remote pool of non-local dynamic IP addresses of the remote network in response to the determination that the remote pool of non-local dynamic IP addresses is able to assign the non-local dynamic IP address; and means for establishing an OSI layer 3 tunnel between the local network and the remote network for transmission of IP packets.

20. The communication system of claim 19 in which the communication device is located in a local coverage area that is associated with the local network having the local pool of local dynamic IP addresses.

21. The communication system of claim 20 in which the remote network assigns the non-local dynamic IP address and in which the remote network is associated with a remote coverage area, the remote network maintains the non-local dynamic IP address in response to the communication device moving into the remote coverage area associated with the remote network, the OSI layer 3 tunnel between the local router of the local network and the remote router of the remote network is removed, and the remote network is treated as the local network such that the remote network functions as another local network.

22. The communication system of claim 21 including means for establishing a new OSI layer 3 tunnel between another remote router of another remote network and the remote router in response upon the communication device moving from the remote coverage area to another coverage area associated with the other remote network, and means for removing the OSI layer 3 tunnel between the local network and the remote network.

23. The communication system of claim 20 in which another remote network associated with another remote coverage area assigns the non-local dynamic IP address, the other remote network maintains the non-local dynamic IP address in response to the communication device moving into the other remote coverage area associated with the other remote network, and the other remote network is treated as the local network such that the other remote network functions as another local network.

24. The communication system of claim 19 in which a configure Nak message carrying the non-local dynamic IP address and a remote router's IP address are sent from a local router of the local network to the communication device.

25. The communication system of claim 24 in which the local network includes a local visitor database device for receiving the address request from the local router.

26. The communication system of claim 25 in which the remote network includes a remote visitor database device for receiving the address request from the local visitor database device of the local network.

27. The communication system of claim 26 in which the local visitor database device of the local network and the remote visitor database device of the remote network are both either:

(a) RADIUS servers, or (b) ANSI-41 servers.

28. The communication system of claim 24 including an independent visitor database device for receiving the address request from the local router of the local network and for transmitting the address request to a remote protocol server of the remote network.

29. The communication system of claim 28 in which the independent visitor database device is either:

(a) a RADIUS server, or (b) an ANSI-41 server.

30. The communication system of claim 24 including an independent protocol server for receiving the address request from the local router of the local network and for receiving either a local dynamic IP address or a non-local dynamic IP address.

31. The communication system of claim 24 in which the remote network includes a remote protocol server for receiving the address request from at least one of: (a) a local protocol server of the local network, (b) the remote visitor database device of the remote network, and (c) an independent visitor database device.

32. The communication system of claim 31 in which the remote protocol server and the local protocol server are both Dynamic Host Configuration Protocol (DHCP) servers.

33. The communication system of claim 24 including an independent protocol server for receiving the address request from the local router of the local network and for receiving either a local dynamic IP address or a non-local dynamic IP address.

34. The communication system of claim 30 in which the remote pool of non-local dynamic IP addresses receives the address request from the remote protocol server of the remote network.

35. The communication system of claim 34 in which the non-local dynamic IP address is used for the duration of a communication session between the communication device and the IP network including means for sending the non-local dynamic IP address from the remote network to the communication device.

36. The communication system of claim 34 in which another non-local dynamic IP address from another remote network that has the other non-local dynamic IP address available is assigned to the communication device in response to the determination that the remote pool of non-local dynamic IP addresses is not able to assign non-local dynamic IP addresses.

37. The communication system of claim 19 including a local router of the local network for transmitting a tunnel set up request to a remote router of the remote network to establish the OSI layer 3 tunnel, and a communication link between the remote router and the IP network.

\* \* \* \* \*